(12) United States Patent
Brimeyer et al.

(10) Patent No.: US 11,019,770 B2
(45) Date of Patent: Jun. 1, 2021

(54) HARVESTER WING LEVELING CONFIGURATION

(71) Applicant: Deere & Company, Moline, IL (US)

(72) Inventors: Alex Brimeyer, Bettendorf, IA (US); Benjamin M. Lovett, Colona, IL (US); Michael J. Hodson, Silvis, IL (US)

(73) Assignee: DEERE & COMPANY, Moline, IL (US)

( * ) Notice: Subject to any disclaimer, the term of this patent is extended or adjusted under 35 U.S.C. 154(b) by 190 days.

(21) Appl. No.: 16/423,642

(22) Filed: May 28, 2019

(65) Prior Publication Data

US 2020/0375105 A1 Dec. 3, 2020

(51) Int. Cl.
*A01D 41/14* (2006.01)
*A01B 63/02* (2006.01)
*A01D 61/00* (2006.01)
*A01D 34/14* (2006.01)

(52) U.S. Cl.
CPC ............ *A01D 41/141* (2013.01); *A01B 63/02* (2013.01); *A01D 34/14* (2013.01); *A01D 61/002* (2013.01)

(58) Field of Classification Search
CPC .... A01D 41/141; A01D 34/14; A01D 61/002; A01D 41/144; A01B 63/02; A01B 73/044
USPC .......................................................... 56/11.9
See application file for complete search history.

(56) References Cited

U.S. PATENT DOCUMENTS

| | | | |
|---|---|---|---|
| 10,070,575 B2 | 9/2018 | Wenger et al. | |
| 2007/0204585 A1* | 9/2007 | Lovett | A01D 61/002 56/15.8 |
| 2018/0153102 A1* | 6/2018 | Dunn | A01D 41/127 |
| 2018/0338418 A1 | 11/2018 | Ricketts et al. | |
| 2019/0053429 A1* | 2/2019 | Cook | A01D 41/06 |
| 2019/0110402 A1* | 4/2019 | Vandeven | A01D 41/14 |
| 2019/0110403 A1* | 4/2019 | Braet | A01D 61/02 |
| 2019/0110404 A1* | 4/2019 | Vandeven | A01D 41/141 |

(Continued)

OTHER PUBLICATIONS

Macdon, "30', 36' & 39' Model 972/973/974 Harvest Header, Slow Speed Transport Option, Operator's Manual," published Nov. 2004 (24 pages).

(Continued)

*Primary Examiner* — Thomas B Will
*Assistant Examiner* — Matthew Ian Neal
(74) *Attorney, Agent, or Firm* — Michael Best & Friedrich LLP (57) ABSTRACT

A harvesting platform includes a first section and extends along a first section plane that is substantially parallel to a ground surface along which the harvesting platform moves with a combine. A second section is connected to the first side of the first section, and rotates with respect to the first section within a range of angular positions. A locking mechanism retains the second section in a position with respect to the first section while activated, and permits movement of the second section with respect to the first section while deactivated. A controller receives a first signal indicative of the position, and sends a second signal to deactivate the locking mechanism in response to the position being at a positive non-parallel angle with respect to the first section plane. The second section moves toward the first section plane in response to gravity while the locking mechanism is deactivated.

20 Claims, 12 Drawing Sheets

(56) References Cited

U.S. PATENT DOCUMENTS

2020/0008354 A1* 1/2020 Brimeyer .............. A01B 63/008
2020/0390035 A1* 12/2020 Hunt .................... A01D 41/144

OTHER PUBLICATIONS

Macdon "D50 and D60 Harvest Header FD70 FlexDraper Combine Header," published Jul. 2007 (144 pages).
Macdon, "FD75 FlexDraper Combine Header with CA25 Combine Adapter," published Jun. 2017 (308 pages).

* cited by examiner

HARVESTER WING LEVELING CONFIGURATION

BACKGROUND

The present disclosure relates to harvesters and wing leveling for harvesters.

SUMMARY

In some embodiments, the disclosure provides a harvester including a combine having a prime mover that moves the combine over a ground surface in a direction of travel and a feeder house that defines a centerline. A harvesting platform is connected to the combine for movement with the combine over the ground surface. The harvesting platform includes a center section connected to the combine that has a first side and a second side opposite the first side. The center section extends along a center section plane that is substantially perpendicular to the centerline of the feeder house. A first wing is connected to the first side of the center section and is rotatable with respect to the center section within a first range of angular positions. A first locking mechanism retains the first wing in a first position with respect to the center section while the first locking mechanism is activated and permits movement of the first wing with respect to the center section while the first locking mechanism is deactivated. A second wing is connected to the second side of the center section and is rotatable with respect to the center section within a second range of angular positions. A second locking mechanism retains the second wing in a second position with respect to the center section while the second locking mechanism is activated and permits movement of the second wing with respect to the center section while the second locking mechanism is deactivated. A controller receives a first signal indicative of the first position and a second signal indicative of the second position. The controller sends a third signal to the first locking mechanism to deactivate the first locking mechanism in response to the first position being at a positive non-parallel angle with respect to the center section plane, and sends a fourth signal to the second locking mechanism to deactivate the second locking mechanism in response to the second position being at a positive non-parallel angle with respect to the center section plane. The first wing moves toward the center section plane in response to gravity while the first locking mechanism is deactivated, and the second wing moves toward the center section plane in response to gravity while the second locking mechanism is deactivated.

In some embodiments, the disclosure provides a harvesting platform that can be connected to a combine for movement with the combine over a ground surface in a direction of travel. The harvesting platform includes a center section connected to the combine that has a first side and a second side opposite the first side. The center section extends along a center section plane that is substantially parallel to the ground surface. A first wing is connected to the first side of the center section and is rotatable with respect to the center section within a first range of angular positions. A first locking mechanism retains the first wing in a first position with respect to the center section while the first locking mechanism is activated and permits movement of the first wing with respect to the center section while the first locking mechanism is deactivated. A second wing is connected to the second side of the center section and is rotatable with respect to the center section within a second range of angular positions. A second locking mechanism retains the second wing in a second position with respect to the center section while the second locking mechanism is activated and permits movement of the second wing with respect to the center section while the second locking mechanism is deactivated. A controller receives a first signal indicative of the first position and a second signal indicative of the second position. The controller sends a third signal to the first locking mechanism to deactivate the first locking mechanism in response to the first position being at a positive non-parallel angle with respect to the center section plane, and sends a fourth signal to the second locking mechanism to deactivate the second locking mechanism in response to the second position being at a positive non-parallel angle with respect to the center section plane. The first wing moves toward the center section plane in response to gravity while the first locking mechanism is deactivated, and the second wing moves toward the center section plane in response to gravity while the second locking mechanism is deactivated.

In some embodiments the disclosure provides a harvesting platform connected to a combine for movement with the combine over a ground surface in a direction of travel. The harvesting platform includes a first section connected to the combine. The first section has a first side and a second side opposite the first side, and the first section extends along a first section plane that is substantially parallel to the ground surface. A second section is connected to the first side of the first section, and is rotatable with respect to the first section within a range of angular positions. A locking mechanism retains the second section in a position with respect to the first section while the locking mechanism is activated, and permits movement of the second section with respect to the first section while the locking mechanism is deactivated. A controller receives a first signal indicative of the position, and sends a second signal to the locking mechanism to deactivate the locking mechanism in response to the position being at a positive non-parallel angle with respect to the first section plane. The second section moves toward the first section plane in response to gravity while the locking mechanism is deactivated.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
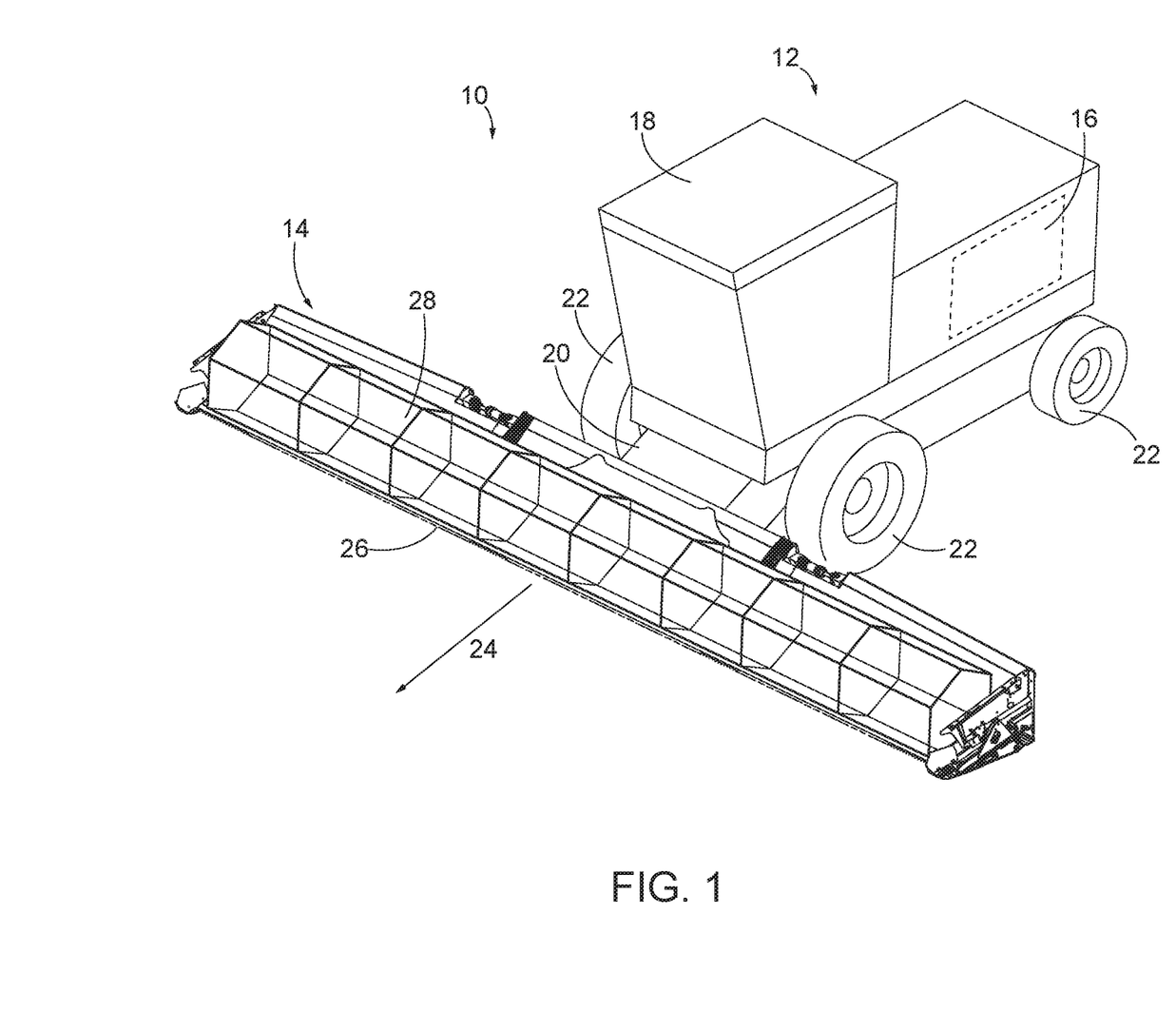
FIG. 1 is a perspective view of a harvester.

FIG. 1 illustrates a harvester 10 according to some embodiments. The illustrated harvester 10 includes a combine 12 and a harvesting platform 14. The combine 12 includes a prime mover 16, a cab 18, a feeder house 20, and a plurality of ground-engaging devices 22. The prime mover 16 is configured to move the combine 12 in a direction of travel 24 via the ground-engaging devices 22. The illustrated ground-engaging devices 22 are wheels, but tracks or other suitable ground-engaging devices can be utilized.

The harvesting platform 14 includes a cutter bar 26 that is configured to cut grain being harvested, and a reel 28 that configured to press the grain against the cutter bar to thereby cut the grain.

Figure 2:
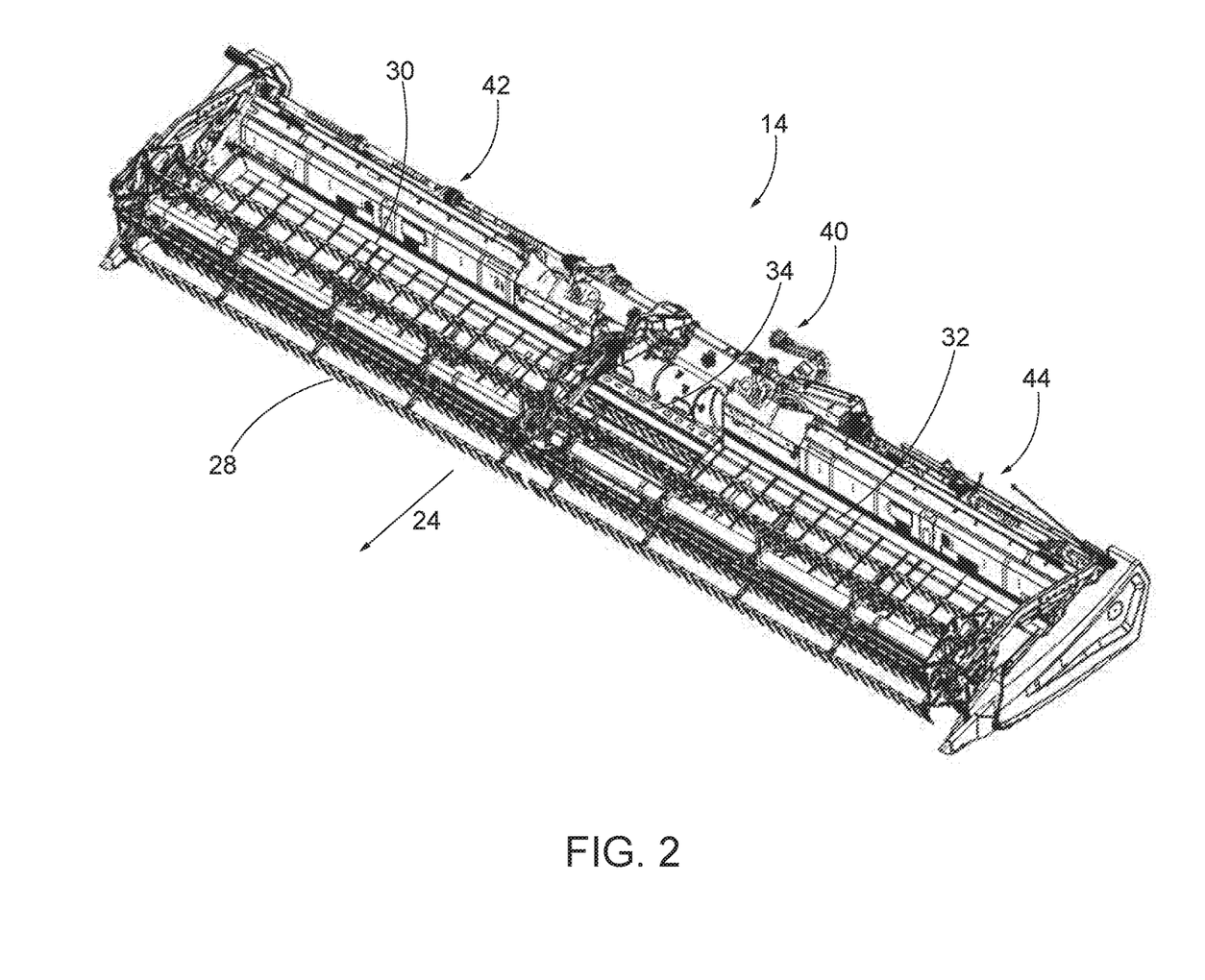
FIG. 2 is a perspective view of a harvesting platform.

FIG. 2 shows the harvesting platform 14 in greater detail. The harvesting platform 14 includes a first conveyor assembly 30, a second conveyor assembly 32, and a third conveyor assembly 34. The first conveyor assembly 30 is configured to move harvested grain generally perpendicular to the direction of travel 24 toward the third conveyor assembly 34. The second conveyor assembly 32 is configured to move harvested grain generally perpendicular to the direction of travel 24 toward the third conveyor assembly 34. The third conveyor assembly 34 is configured to move harvested grain opposite of the direction of travel 24 and into the feeder house 20 (see FIG. 1).

Figure 3:
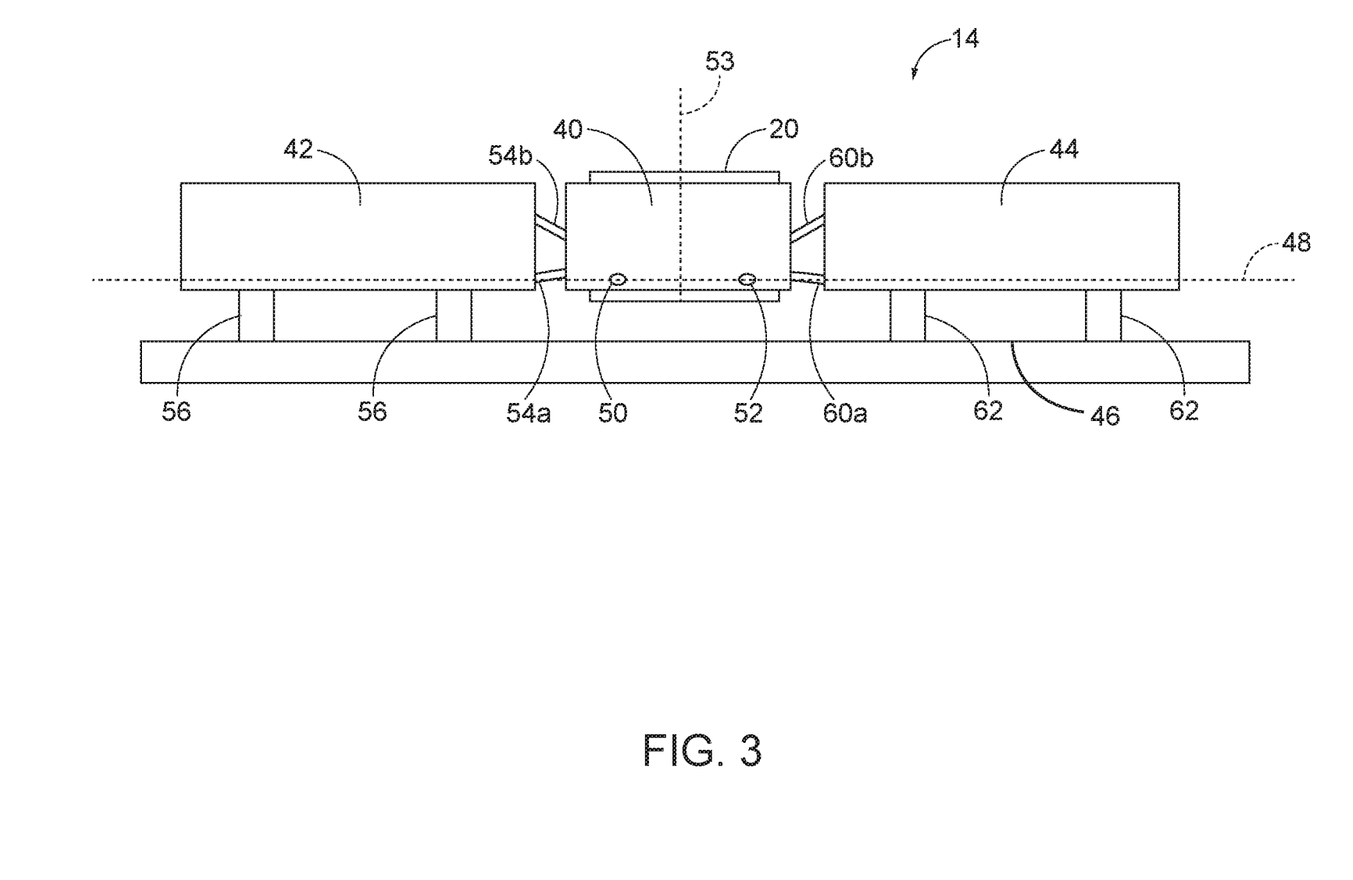
FIG. 3 is a schematic front view of the harvesting platform.

FIG. 3 shows the harvesting platform 14 having a center section 40, a first wing 42 and a second wing 44 all of which are supported on a ground surface 46. The center section 40 is connected to the feeder house 20 of the combine 12 and is permitted to pivot about a relatively small angle (i.e., less than about +/−5 degrees) with respect to the feeder house 20 such that the center section 40 is substantially aligned with the feeder house 20 and the combine 12. The center section 40 extends along a center section plane 48 and includes first and second pivot points 50, 52 positioned within the center section plane 48. In some embodiments, the feeder house 20 defines a center line 53 extending vertically through the feeder house 20 and is substantially perpendicular to the center section plane 48. Substantially perpendicular is defined herein as being between 85 and 95 degrees.

The first wing 42 is connected to the center section 40 by wing control arms 54a, 54b. The wing control arms 54a, 54b are connected to the first pivot point 50 of the center section 40. The first wing 42 is supported on two ground-engaging wheels 56 that move along the ground surface 46. The ground-engaging wheels 56 bear much of the weight of the first wing 42 during operation such that the ground-engaging wheels 56 determine the height of the first wing 42 above the ground surface 46. During operation, the first wing 42 is permitted to pivot within a first range of angles with respect to the center section 40. In some embodiments, the first range of angles is between about +/−15 degrees with respect to the center section 40. In some embodiments, the first range of angles is between about +/−10 degrees with respect to the center section 40. In some embodiments, the first range of angles is between about +/−5 degrees with respect to the center section 40.

The second wing 44 is connected to the center section 40 by wing control arms 60a, 60b. The wing control arms 60a, 60b are connected to the second pivot point 52 of the center section 40. The second wing 44 is supported on two ground-engaging wheels 62 that move along the ground surface 46. The ground-engaging wheels 62 bear much of the weight of the second wing 44 during operation such that the ground-engaging wheels 62 set the height of the second wing 44 above the ground surface 46. During operation, the second wing 44 is permitted to pivot within a second range of angles with respect to the center section 40. In some embodiments, the second range of angles is between about +/−15 degrees with respect to the center section 40. In some embodiments, the second range of angles is between about +/−10 degrees with respect to the center section 40. In some embodiments, the second range of angles is between about +/−5 degrees with respect to the center section 40.

The first wing 42 and the second wing 44 can pivot independently such that the first wing 42 can pivot within the first range of angles while the second wing 44 pivots independently within the second range of angles.

Figure 4:
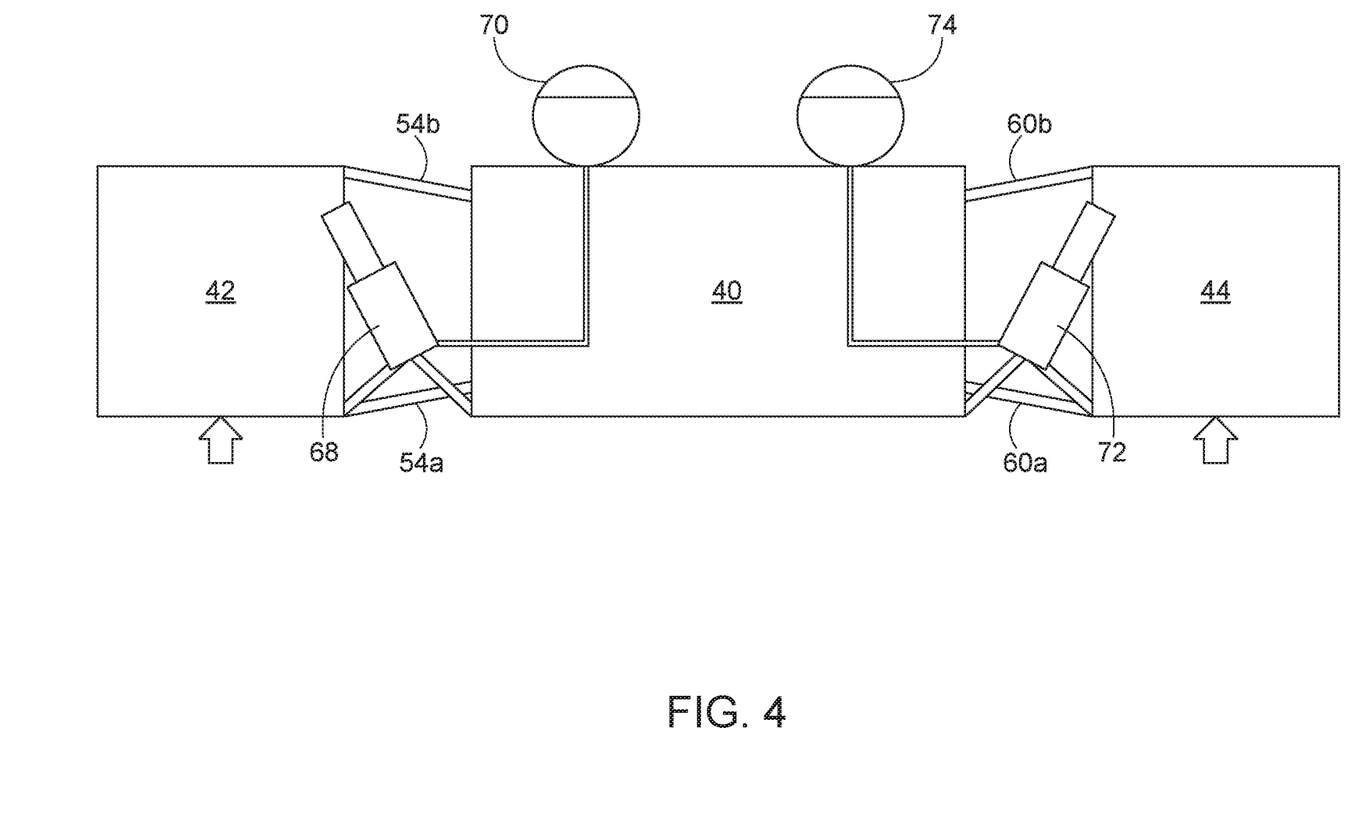
FIG. 4 is a schematic view of the wings connected to a center section.

FIG. 4 illustrates a wing float system for the center section 40, the first wing 42 and the second wing 44. The first wing 42 is connected to the center section 40 by the wing control arms 54a, 54b and a first cylinder 68. The first cylinder 68 includes a first end connected to the first wing 42 and a second end that is connected to both the center section 40 and the first wing 42. The first cylinder 68 is fluidly connected to a first accumulator 70 such that when the first wing 42 is in a level position (substantially parallel to the center section plane 48) a pressure in the first accumulator 70 provides a force to the first cylinder 68 to bear a portion of the weight of the first wing 42.

The second wing 44 is connected to the center section 40 by the wing control arms 60a, 60b and a second cylinder 72. The second cylinder 72 includes a first end connected to the second wing 44 and a second end that is connected to both the center section 40 and the second wing 44. The second cylinder 72 is fluidly connected to a second accumulator 74 such that when the second wing 44 is in a level position (substantially parallel to the center section plane 48) a pressure in the second accumulator 74 provides a force to the second cylinder 72 to bear a portion of the weight of the second wing 44.

Figure 5:
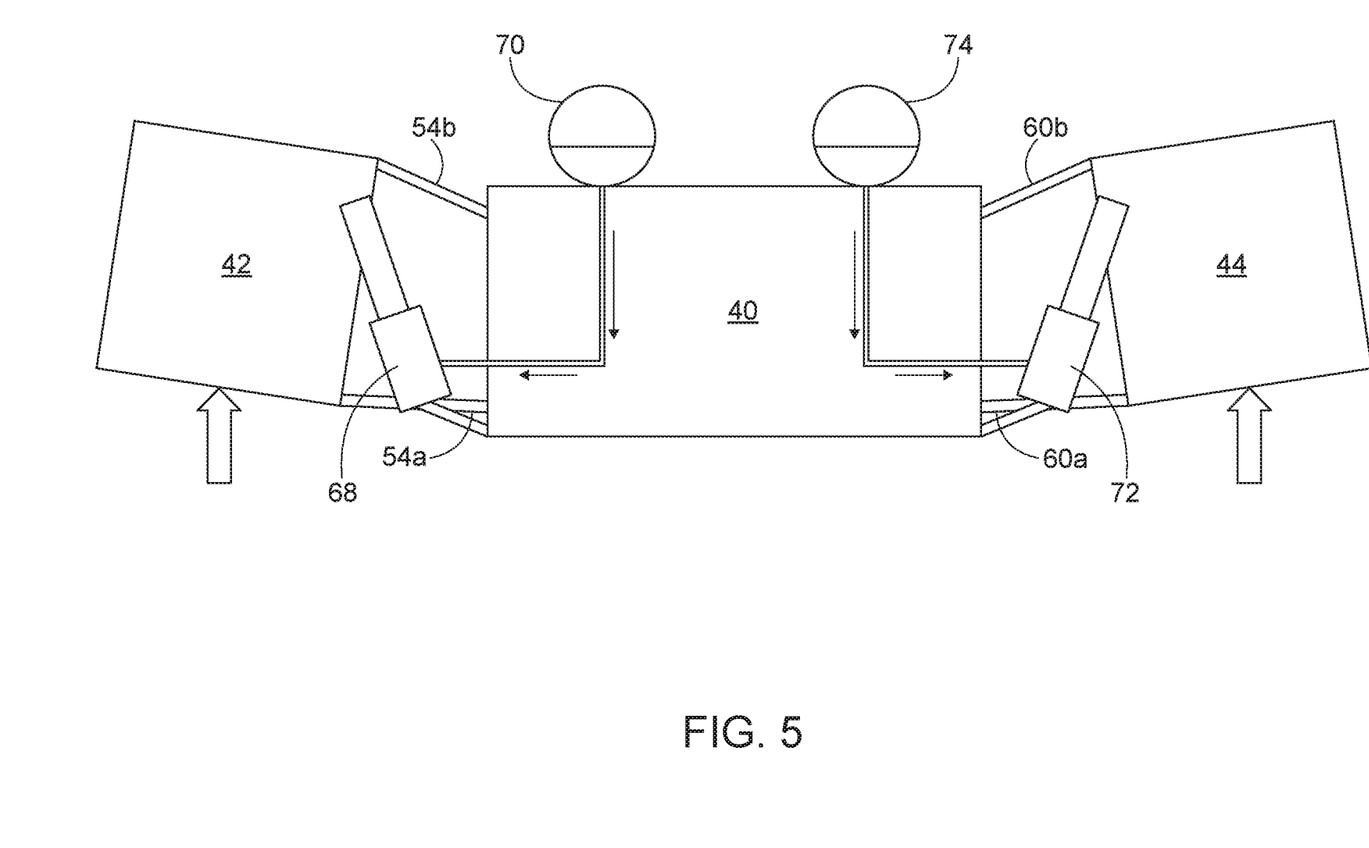
FIG. 5 is a schematic view of the wings floating upward.

FIG. 5 illustrates the wing float system when both the first wing 42 and the second wing 44 encounter an input (such as a hill or bump in the ground surface 46) and travel upward. The first wing 42 is pushed upward by the ground-engaging wheels 56 moving upward in response to the input. Fluid is drawn from the first accumulator 70 into the first cylinder 68 in response to the upward movement of the first wing 42. The pressure in the first accumulator 70 is lower when the first wing 42 is above a level position (i.e., at a positive, non-parallel angle with respect to the center section plane 48). The second wing 44 is pushed upward by the ground-engaging wheels 62 moving upward in response to the input. Fluid is drawn from the second accumulator 74 into the second cylinder 72 in response to the upward movement of the second wing 44. The pressure in the second accumulator 74 is lower when the second wing 44 is above a level position (i.e., at a positive, non-parallel angle with respect to the center section plane 48).

Figure 6:
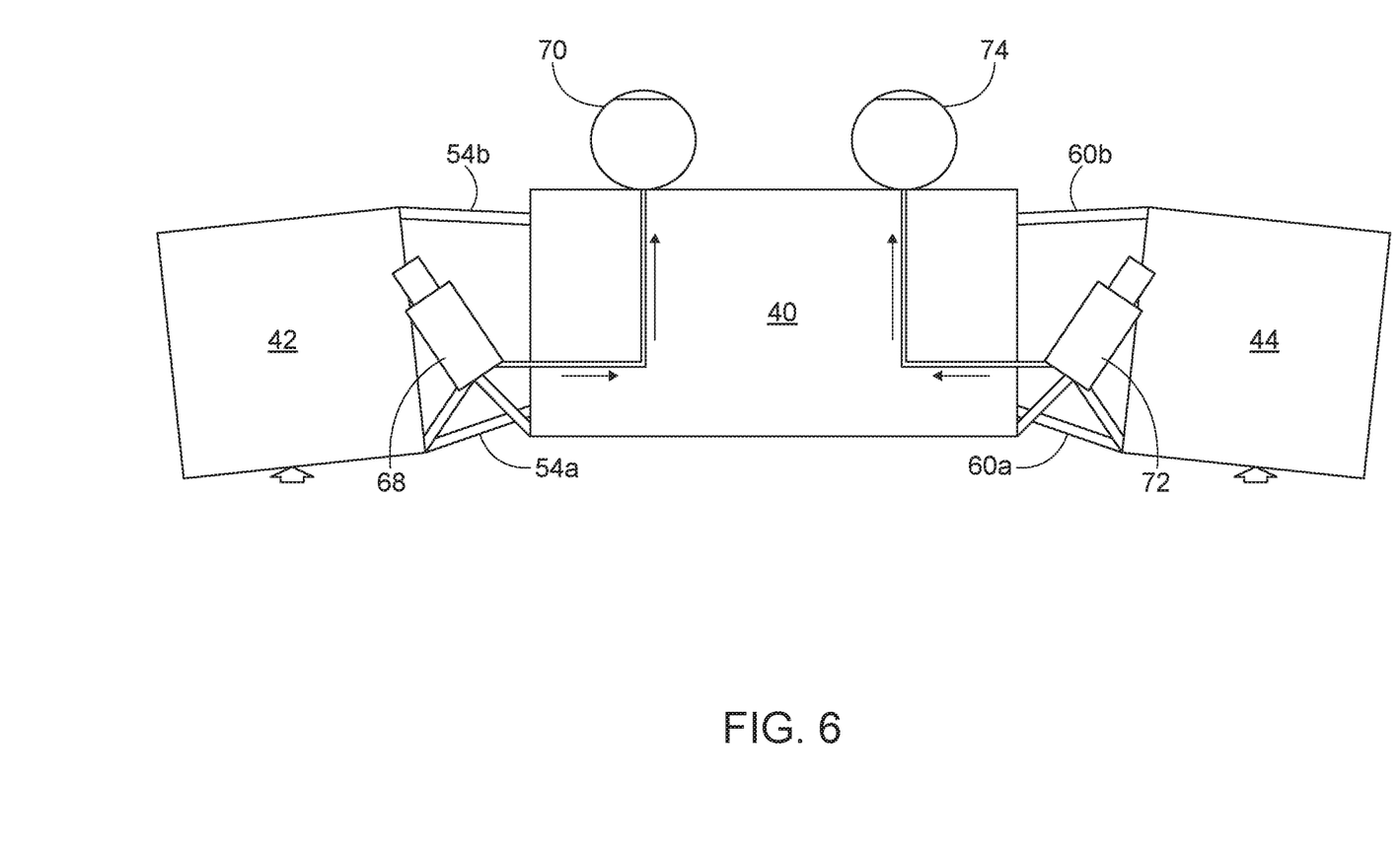
FIG. 6 is a schematic view of the wings floating downward.

FIG. 6 illustrates the wing float system when the first wing 42 encounters an input (such as a recess or valley in the ground surface 46) and travels downward. The first wing 42 is pushed downward by gravity until the ground-engaging wheels 56 engage the ground surface 46. Fluid is moved from the first cylinder 68 into the first accumulator 70 in response to the downward movement of the first wing 42. The pressure in the first accumulator 70 is greater when the first wing 42 is below a level position (i.e., at a negative, non-parallel angle with respect to the center section plane 48). The ground-engaging wheels 56 and the first cylinder 68 bear the weight of the first wing 42. The first accumulator 70 permits passive adjustment of the first wing 42 within the first range of angles as described above. The second wing 44 is pushed downward by gravity until the ground-engaging wheels 62 engage the ground surface 46. Fluid is moved from the second cylinder 72 into the second accumulator 74 in response to the downward movement of the second wing 44. The pressure in the second accumulator 74 is greater when the second wing 44 is below a level position (i.e., at a negative, non-parallel angle with respect to the center section plane 48). The ground-engaging wheels 62 and the second cylinder 72 bear the weight of the second wing 44. The second accumulator 74 permits passive adjustment of the second wing 44 within the second range of angles as described above.

Figure 7:
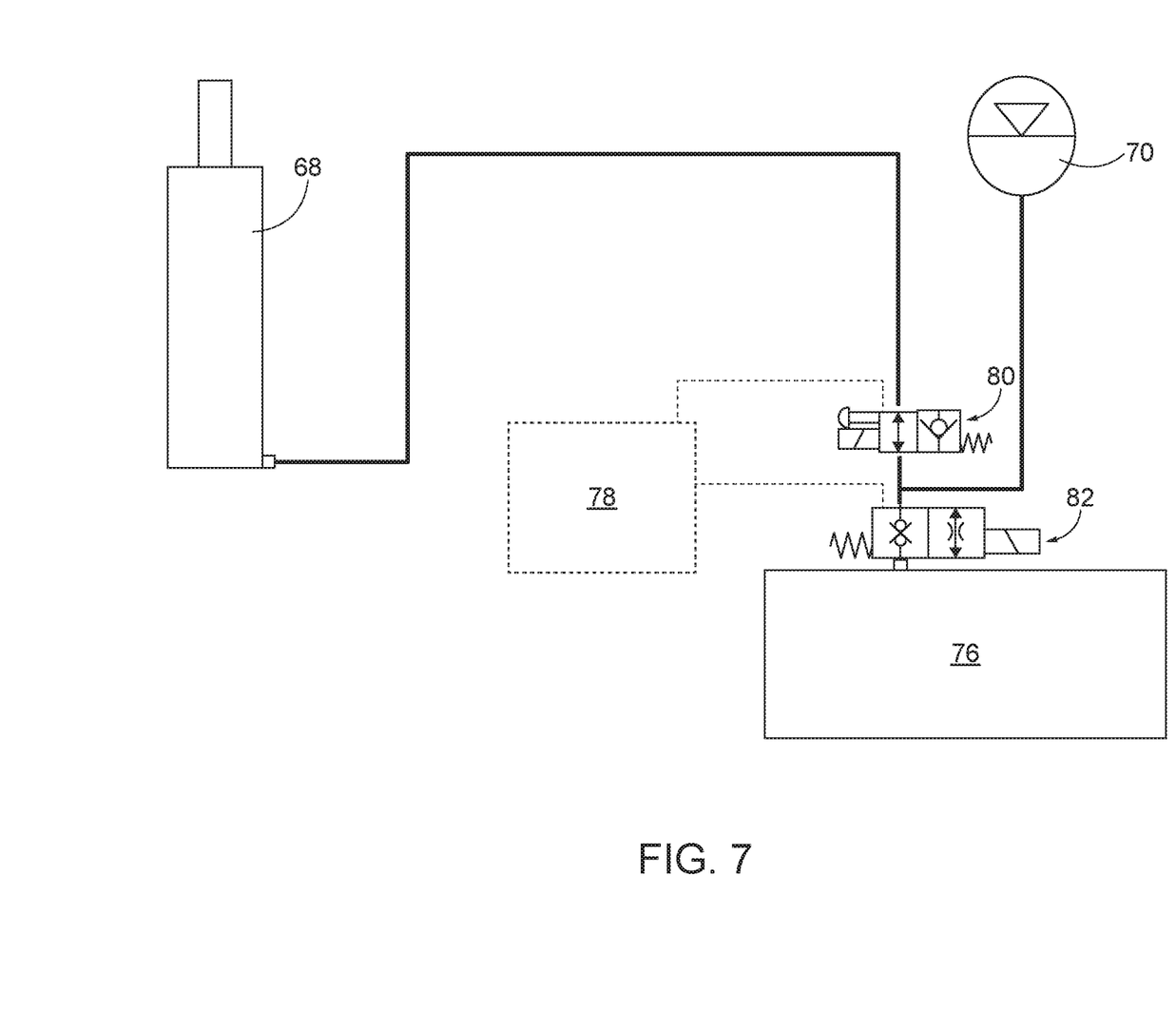
FIG. 7 is a schematic view of an unlocked wing circuit with the first wing in an operating position.

FIG. 7 illustrates a first hydraulic circuit including the first cylinder 68, the first accumulator 70, a fluid reservoir 76, a controller 78, a first valve 80 and a second valve 82. The controller 78 is electrically connected to the first valve 80 to send signals to the first valve 80 to open and close the first valve 80. Fluid flows between the first cylinder 68 and the first accumulator 70 while the first valve 80 is open and is inhibited from flowing between the first cylinder 68 and the first accumulator 70 while the first valve 80 is closed.

The controller 78 is also electrically connected to the second valve 82 to send signals to the second valve 82 to open and close the second valve 82. Fluid flows between the reservoir 76 and the first accumulator 70 while the second valve 82 is open and is inhibited from flowing between the reservoir 76 and the first accumulator 70 while the second valve 82 is closed. While both the first valve 80 and the second valve 82 are opened, fluid is permitted to flow between the first cylinder 68, the first accumulator 70 and the reservoir 76. During normal operation such as shown in FIGS. 4-6, the first valve 80 is open to permit fluid flow between the first cylinder 68 and the first accumulator 70 to permit the first wing 42 to be passively raised and lowered in response to changes in terrain.

Figure 8:
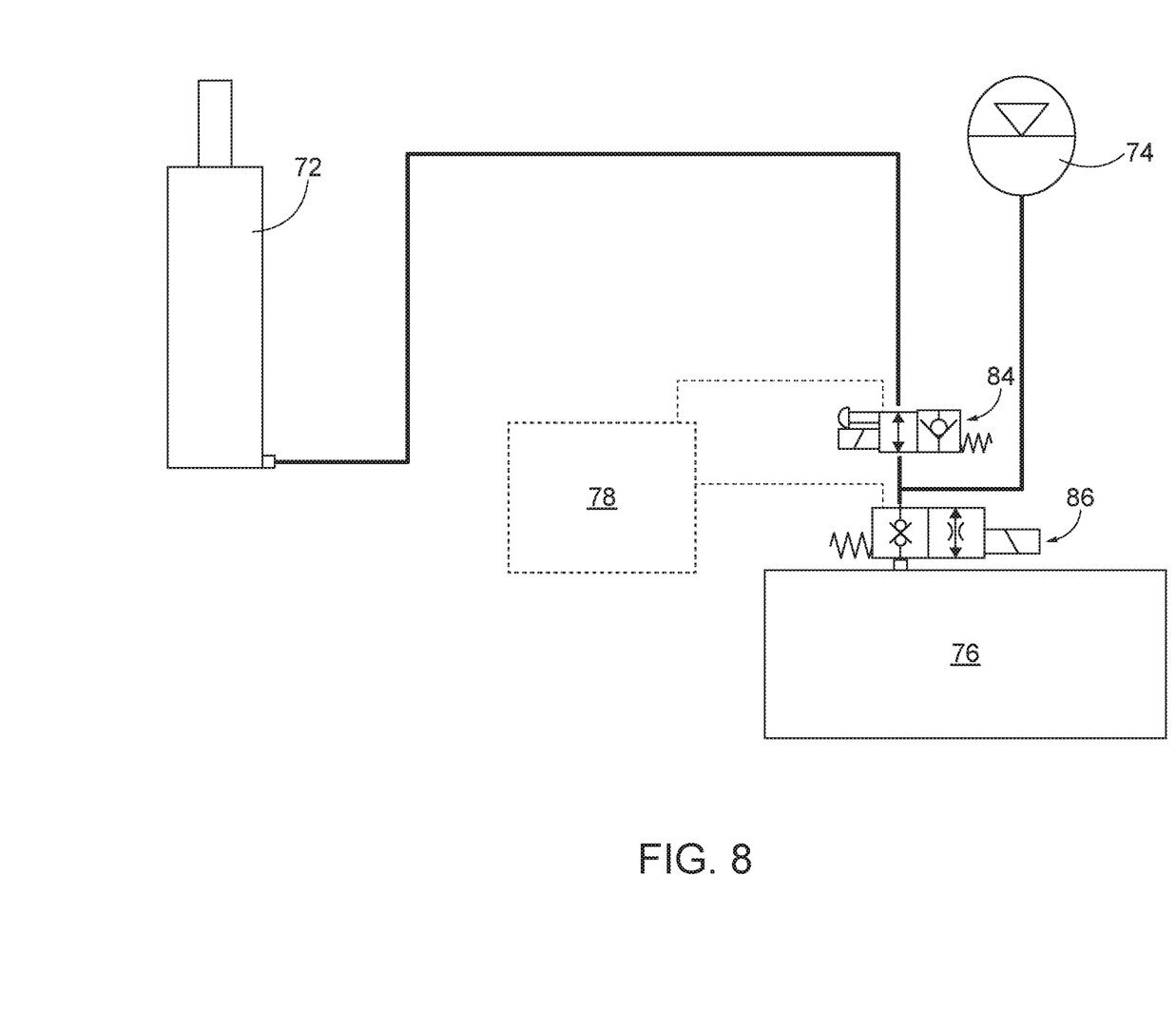
FIG. 8 is a schematic view of an unlocked wing circuit with the second wing in an operating position.

FIG. 8 illustrates a second hydraulic circuit including the second cylinder 72, the second accumulator 74, the fluid reservoir 76, the controller 78, a third valve 84, and a fourth valve 86. The controller 78 is electrically connected to the third valve 84 to send signals to the third valve 84 to open and close the third valve 84. Fluid flows between the second cylinder 72 and the second accumulator 74 while the third valve 84 is open and is inhibited from flowing between the second cylinder 72 and the second accumulator 74 while the third valve 84 is closed.

The controller 78 is also electrically connected to the fourth valve 86 to send signals to the fourth valve 86 to open and close the fourth valve 86. Fluid flows between the reservoir 76 and the second accumulator 74 while the fourth valve 86 is open and is inhibited from flowing between the reservoir 76 and the second accumulator 74 while the fourth valve 86 is closed. While both the third valve 84 and the fourth valve 86 are opened, fluid is permitted to flow between the second cylinder 72, the second accumulator 74 and the reservoir 76. During normal operation such as shown in FIGS. 4-6, the third valve 84 is open to permit fluid flow between the second cylinder 72 and the second accumulator 74 to permit the second wing 44 to be passively raised and lowered in response to changes in terrain.

The reservoir 76 functions a secondary accumulator to permit pressure regulation between the first cylinder 68 and the first accumulator 70 as well as between the second cylinder 72 and the second accumulator 74. The reservoir 76 also functions as a source of fluid when a pump is utilized to direct fluid into the first cylinder 68 to automatically raise the first wing 42, or into the second cylinder 72 to automatically raise the second wing 44.

Figure 9:
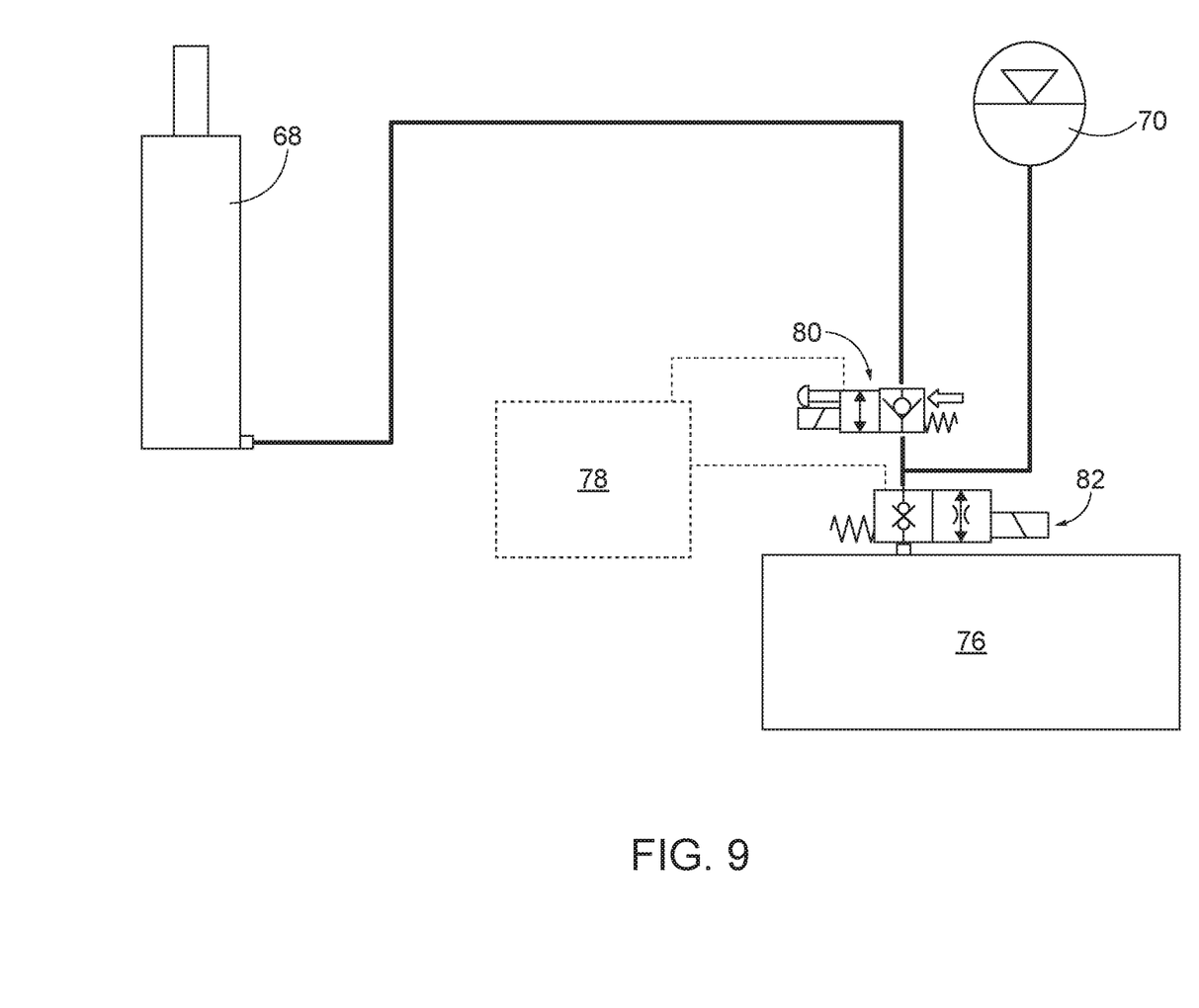
FIG. 9 is a schematic view of a locked wing circuit with the first wing in a raised position.

FIG. 9 illustrates the first hydraulic circuit in which the first valve 80 has been closed in response a signal from the controller 78. For example, when the operator selects a transport operation of the harvester 10, the harvester 10 transitions from harvesting to transport. The controller 78 sends a signal to the first valve 80 to close to thereby retain the first wing 42 in the position in which the first wing 42 was at when harvesting was concluded.

Figure 10:
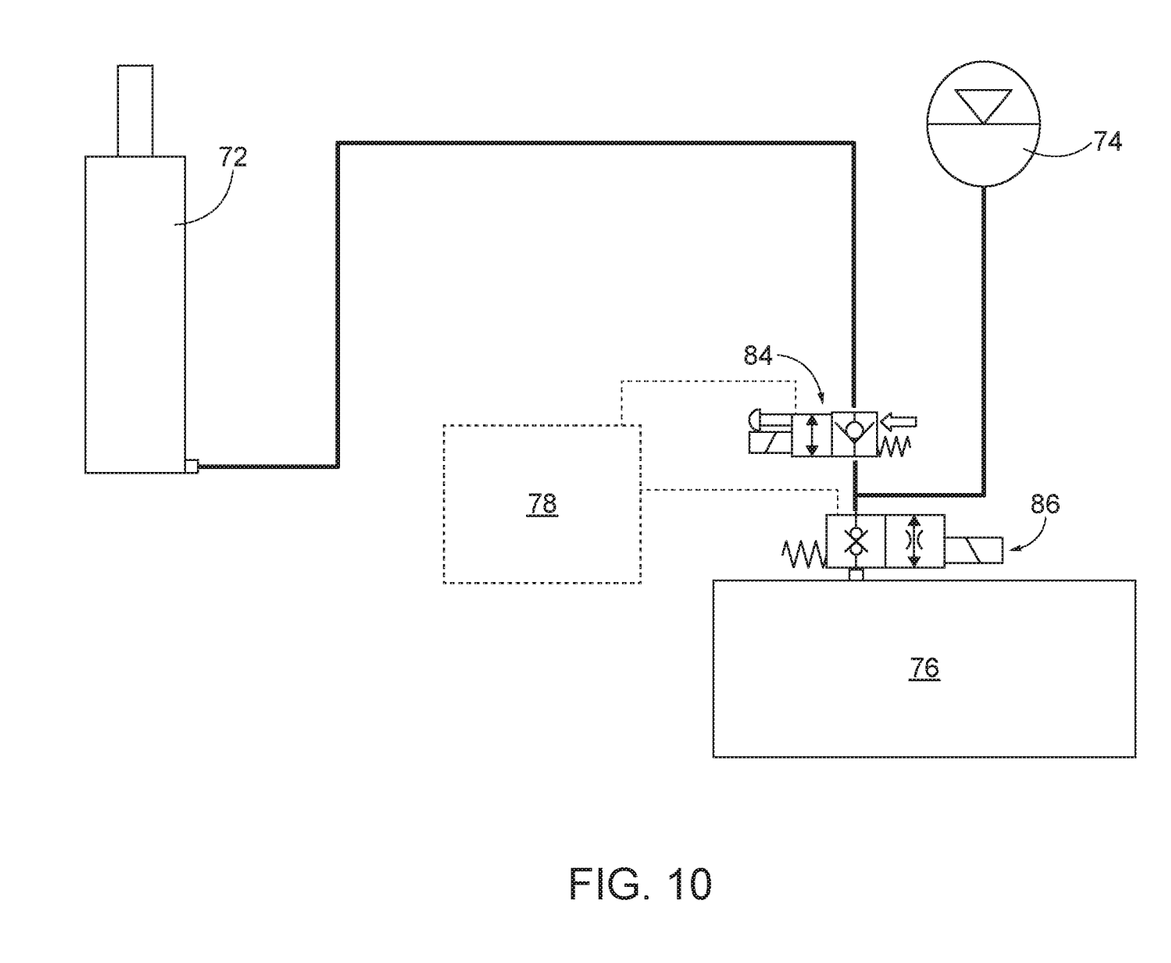
FIG. 10 is a schematic view of a locked wing circuit with the second wing in a raised position.

FIG. 10 illustrates the second hydraulic circuit in which the third valve 84 has been closed in response to a signal from the controller 78. For example, when the operator selects a transport operation of the harvester 10, the harvester 10 transitions from harvesting to transport. The controller 78 sends a signal to the third valve 84 to close to thereby retain the second wing 44 in the position in which the second wing 44 was at when harvesting was concluded.

Figure 11:
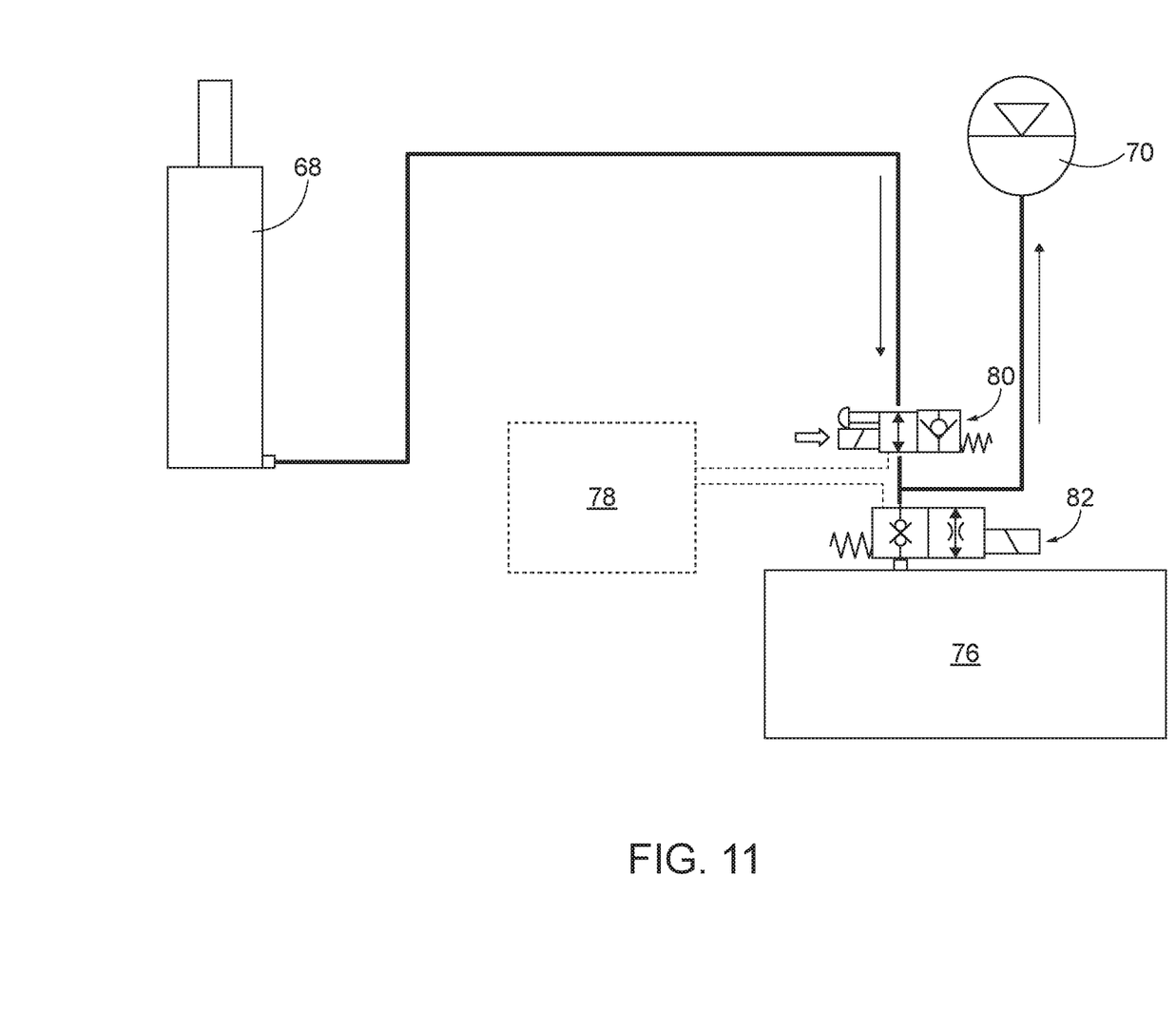
FIG. 11 is a schematic view of an unlocked wing circuit with the first wing in a raised position.

The controller 78 receives a first signal indicative of the first position of the first wing 42. If the first wing 42 is retained in a raised position such as the position shown in FIG. 5 (i.e., at a positive, non-parallel angle with respect to the center section plane 48), then the controller 78 sends a signal to the first valve 80 to open the first valve 80. While the first valve 80 is opened, fluid is permitted to move from the first cylinder 68 through the first valve 80 into the first accumulator 70, as shown in FIG. 11. Fluid is moved in response to gravity pulling down against the first wing 42 to thereby passively lower the first wing 42 when the first valve 80 is opened. The controller 78 continues to receive the first signal indicative of the first position of the first wing 42. If the first position of the first wing 42 is at a level or lowered position (i.e., substantially parallel to the center section plane 48 or at a negative, non-parallel angle with respect to the center section plane 48), then the controller 78 sends a signal to the first valve 80 to close the first valve 80. While the first valve 80 is closed, fluid is inhibited from moving from the first cylinder 68 through the first valve 80 into the first accumulator 70 as shown in FIG. 9.

Figure 12:
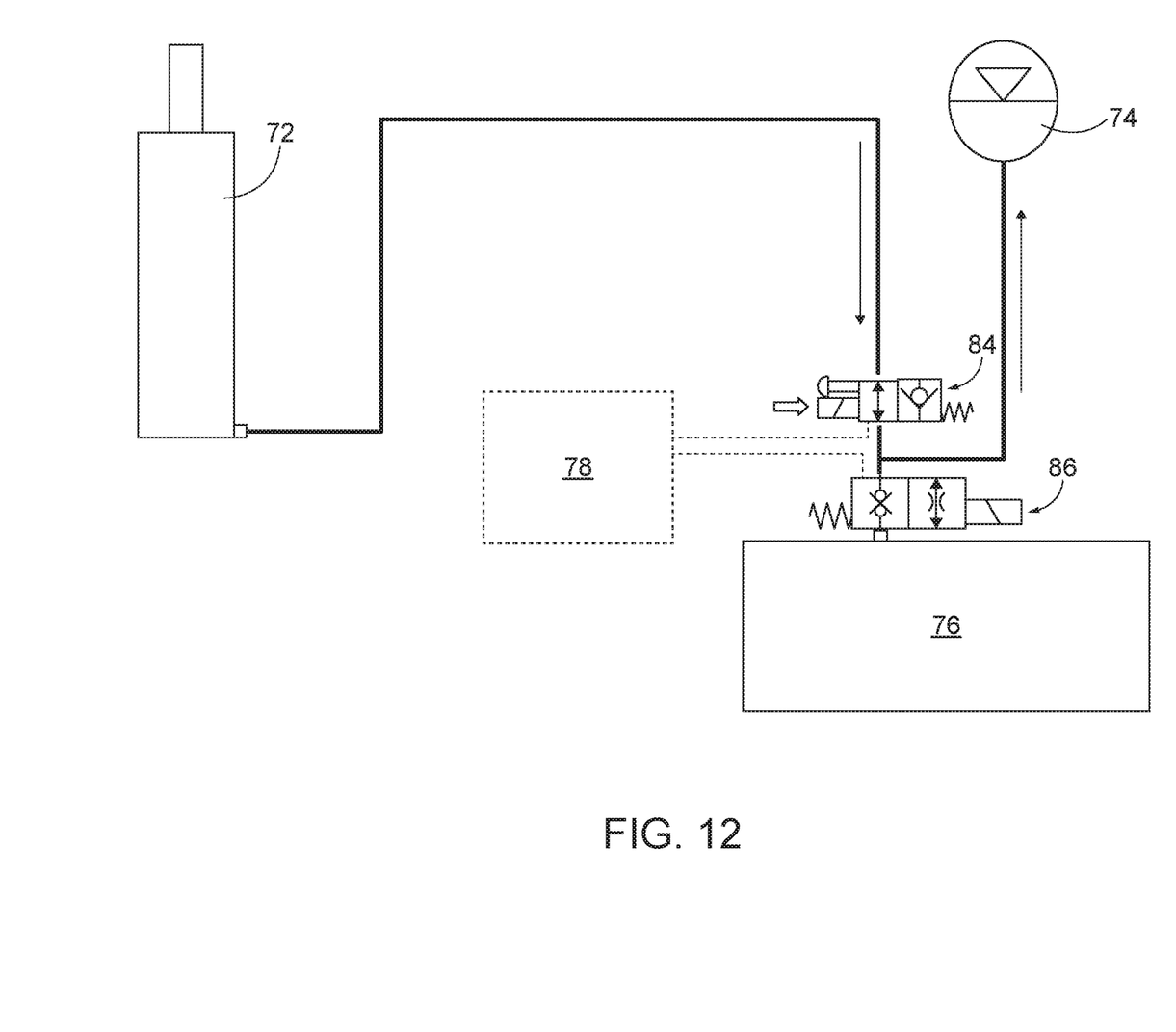
FIG. 12 is a schematic view of an unlocked wing circuit with the second wing in a raised position.

The controller 78 also receives a second signal indicative of the second position of the second wing 44. If the second wing 44 is retained in a raised position such as the position shown in FIG. 5 (i.e., at a positive, non-parallel angle with respect to the center section plane 48), then the controller 78 sends a signal to the third valve 84 to open the third valve 84. While the third valve 84 is opened, fluid is permitted to move from the second cylinder 72 through the third valve 84 into the second accumulator 74 as shown in FIG. 12. Fluid is moved in response to gravity pulling down against the second wing 44 to thereby passively lower the second wing 44 when the third valve 84 is opened. The controller 78 continues to receive the second signal indicative of the second position of the second wing 44. If the second position of the second wing 44 is at a level or lowered position (i.e., substantially parallel to the center section plane 48 or at a negative, non-parallel angle with respect to the center section plane 48), then the controller 78 sends a signal to the third valve 84 to close the third valve 84. While the third valve 84 is closed, fluid is inhibited from moving from the second cylinder 72 through the third valve 84 into the second accumulator 74 as shown in FIG. 10.

What is claimed is:

1. A harvester comprising:
a combine including a prime mover operable to move the combine over a ground surface in a direction of travel and a feeder house, the feeder house defining a centerline; and
a harvesting platform connected to the combine for movement with the combine over the ground surface, the harvesting platform including
a center section connected to the combine, the center section having a first side and a second side opposite the first side, the center section extending along a center section plane that is substantially perpendicular to the centerline of the feeder house,
a first wing connected to the first side of the center section, the first wing being rotatable with respect to the center section within a first range of angular positions,
a first locking mechanism configured to retain the first wing in a first position with respect to the center section while the first locking mechanism is activated and configured to permit movement of the first wing with respect to the center section while the first locking mechanism is deactivated,
a second wing connected to the second side of the center section, the second wing being rotatable with respect to the center section within a second range of angular positions,
a second locking mechanism configured to retain the second wing in a second position with respect to the center section while the second locking mechanism is activated and configured to permit movement of the second wing with respect to the center section while the second locking mechanism is deactivated,
a controller configured to receive a first signal indicative of the first position and a second signal indicative of the second position, the controller configured to send a third signal to the first locking mechanism to deactivate the first locking mechanism in response to the first position being at a positive non-parallel angle with respect to the center section plane, and configured to send a fourth signal to the second locking mechanism to deactivate the second locking mechanism in response to the second position being at a positive non-parallel angle with respect to the center section plane,
wherein the first wing is configured to move toward the center section plane in response to gravity while the first locking mechanism is deactivated, and
wherein the second wing is configured to move toward the center section plane in response to gravity while the second locking mechanism is deactivated.

2. The harvester of claim 1, wherein the controller is configured to send a fifth signal to the first locking mechanism to activate the first locking mechanism and to send a sixth signal to the second locking mechanism to activate the second locking mechanism in response to an operator selecting a transport operation of the harvester.

3. The harvester of claim 2, wherein the controller is configured to continue sending the fifth signal to the first locking mechanism to maintain activation of the first locking mechanism in response to the first position being at a negative non-parallel angle with respect to the center section plane, and is configured to continue sending the sixth signal to the second locking mechanism to maintain activation of the second locking mechanism in response to the second position being at a negative non-parallel angle with respect to the center section plane.

4. The harvester of claim 2, wherein the controller is configured to continue sending the fifth signal to the first locking mechanism to activate the first locking mechanism in response to the first position being substantially parallel to the center section plane, and is configured to continue sending the sixth signal to the second locking mechanism to activate the second locking mechanism in response to the second position being substantially parallel to the center section plane.

5. The harvester of claim 1, wherein the first locking mechanism includes a first cylinder, a first accumulator and a first valve fluidly positioned between the first cylinder and the first accumulator.

6. The harvester of claim 5, wherein while the first locking mechanism is activated, the first valve is closed to inhibit fluid flow between the first cylinder and the first accumulator and while the first locking mechanism is deactivated, the first valve is opened to permit fluid flow from the first cylinder to the first accumulator.

7. The harvester of claim 6, wherein the second locking mechanism includes a second cylinder, a second accumulator and a second valve fluidly positioned between the second cylinder and the second accumulator.

8. The harvester of claim 7, wherein while the second locking mechanism is activated, the second valve is closed to inhibit fluid flow between the second cylinder and the second accumulator and while the second locking mechanism is deactivated, the second valve is opened to permit fluid flow from the second cylinder to the second accumulator.

9. A harvesting platform configured to be coupled to a combine for movement with the combine over a ground surface in a direction of travel, the harvesting platform comprising:
a center section connected to the combine, the center section having a first side and a second side opposite the first side, the center section extending along a center section plane that is substantially parallel to the ground surface;
a first wing connected to the first side of the center section, the first wing being rotatable with respect to the center section within a first range of angular positions;
a first locking mechanism configured to retain the first wing in a first position with respect to the center section while the first locking mechanism is activated and configured to permit movement of the first wing with respect to the center section while the first locking mechanism is deactivated;
a second wing connected to the second side of the center section, the second wing being rotatable with respect to the center section within a second range of angular positions;
a second locking mechanism configured to retain the second wing in a second position with respect to the center section while the second locking mechanism is activated and configured to permit movement of the second wing with respect to the center section while the second locking mechanism is deactivated; and
a controller configured to receive a first signal indicative of the first position and a second signal indicative of the second position, the controller configured to send a third signal to the first locking mechanism to deactivate the first locking mechanism in response to the first position being at a positive non-parallel angle with respect to the center section plane, and configured to send a fourth signal to the second locking mechanism to deactivate the second locking mechanism in response to the second position being at a positive non-parallel angle with respect to the center section plane;

wherein the first wing is configured to move toward the center section plane in response to gravity while the first locking mechanism is deactivated, and wherein the second wing is configured to move toward the center section plane in response to gravity while the second locking mechanism is deactivated.

10. The harvesting platform of claim 9, wherein the controller is configured to send a fifth signal to the first locking mechanism to activate the first locking mechanism and to send a sixth signal to the second locking mechanism to activate the second locking mechanism in response to an operator selecting a transport operation of the combine.

11. The harvesting platform of claim 10, wherein the controller is configured to continue sending the fifth signal to the first locking mechanism to maintain activation of the first locking mechanism in response to the first position being at a negative non-parallel angle with respect to the center section plane, and is configured to continue sending the sixth signal to the second locking mechanism to maintain activation of the second locking mechanism in response to the second position being at a negative non-parallel angle with respect to the center section plane.

12. The harvesting platform of claim 10, wherein the controller is configured to continue sending the fifth signal to the first locking mechanism to activate the first locking mechanism in response to the first position being substantially parallel to the center section plane, and is configured to continue sending the sixth signal to the second locking mechanism to activate the second locking mechanism in response to the second position being substantially parallel to the center section plane.

13. The harvesting platform of claim 9, wherein the first locking mechanism includes a first cylinder, a first accumulator and a first valve fluidly positioned between the first cylinder and the first accumulator.

14. The harvesting platform of claim 13, wherein while the first locking mechanism is activated, the first valve is closed to inhibit fluid flow between the first cylinder and the first accumulator and while the first locking mechanism is deactivated, the first valve is opened to permit fluid flow from the first cylinder to the first accumulator.

15. The harvesting platform of claim 14, wherein the second locking mechanism includes a second cylinder, a second accumulator and a second valve fluidly positioned between the second cylinder and the second accumulator.

16. The harvesting platform of claim 15, wherein while the second locking mechanism is activated, the second valve is closed to inhibit fluid flow between the second cylinder and the second accumulator and while the second locking mechanism is deactivated, the second valve is opened to permit fluid flow from the second cylinder to the second accumulator.

17. A harvesting platform configured to be coupled to a combine for movement with the combine over a ground surface in a direction of travel, the harvesting platform comprising:

a first section connected to the combine, the first section having a first side and a second side opposite the first side, the first section extending along a first section plane that is substantially parallel to the ground surface;

a second section connected to the first side of the first section, the second section being rotatable with respect to the first section within a range of angular positions;

a locking mechanism configured to retain the second section in a position with respect to the first section while the locking mechanism is activated, and configured to permit movement of the second section with respect to the first section while the locking mechanism is deactivated; and a controller configured to receive a first signal indicative of the position, and configured to send a second signal to the locking mechanism to deactivate the locking mechanism in response to the position being at a positive non-parallel angle with respect to the first section plane, wherein the second section is configured to move toward the first section plane in response to gravity while the locking mechanism is deactivated.

18. The harvesting platform of claim 17, wherein the range of angular positions is a first range of angular positions, the locking mechanism is a first locking mechanism, and the position is a first position further comprising a third section connected to the second side of the first section, the third section being rotatable with respect to the first section within a second range of positions, and a second locking mechanism configured to retain the third section in a second position with respect to the first section while the second locking mechanism is activated and configured to permit movement of the third section with respect to the first section while the second locking mechanism is deactivated, wherein the controller is further configured to receive a third signal indicative of the second position and configured to send a fourth signal to the second locking mechanism to deactivate the second locking mechanism in response to the second position being at a positive non-parallel angle with respect to the first section plane, and wherein the third section is configured to move toward the first section plane in response to gravity while the second locking mechanism is deactivated.

19. The harvesting platform of claim 18, wherein the controller is configured to send a fifth signal to the first locking mechanism to activate the first locking mechanism and to send a sixth signal to the second locking mechanism to activate the second locking mechanism in response to an operator selecting a transport operation of the combine, wherein the controller is configured to continue sending the fifth signal to the first locking mechanism to maintain activation of the first locking mechanism in response to the first position being at a negative non-parallel angle with respect to the first section plane, and is configured to continue sending the sixth signal to the second locking mechanism to maintain activation of the second locking mechanism in response to the second position being at a negative non-parallel angle with respect to the first section plane, and wherein the controller is configured to continue sending the fifth signal to the first locking mechanism to activate the first locking mechanism in response to the first position being substantially parallel to the first section plane, and is configured to continue sending the sixth signal to the second locking mechanism to activate the second locking mechanism in response to the second position being substantially parallel to the first section plane.

20. The harvesting platform of claim 17 wherein the locking mechanism includes a cylinder, an accumulator and a valve fluidly positioned between the cylinder and the accumulator, and
wherein while the locking mechanism is activated, the valve is closed to inhibit fluid flow between the cylinder and the accumulator, and while the locking mechanism is deactivated, the valve is opened to permit fluid flow from the cylinder to the accumulator.

* * * * *